(12) United States Patent
Wang et al.

(10) Patent No.: US 10,469,805 B2
(45) Date of Patent: Nov. 5, 2019

(54) LOAD BALANCING METHOD, AND RELATED APPARATUS AND SYSTEM

(71) Applicant: Huawei Technologies Co., Ltd., Shenzhen (CN)

(72) Inventors: Tianke Wang, Shenzhen (CN); Longsheng Xiong, Hangzhou (CN); Rujun Shan, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/969,446

(22) Filed: May 2, 2018

(65) Prior Publication Data

US 2018/0255275 A1 Sep. 6, 2018

Related U.S. Application Data

(63) Continuation of application No. PCT/CN2016/104054, filed on Oct. 31, 2016.

(30) Foreign Application Priority Data

Nov. 2, 2015 (CN) .......................... 2005 1 0734298

(51) Int. Cl.
  *H04N 7/18* (2006.01)
  *H04L 29/08* (2006.01)
  *H04N 5/232* (2006.01)

(52) U.S. Cl.
  CPC .......... *H04N 7/181* (2013.01); *H04L 67/1008* (2013.01); *H04L 67/1012* (2013.01);
  (Continued)

(58) Field of Classification Search
  CPC ............... H04N 7/181; H04N 5/23245; H04N 21/23103; H04N 21/23113;
  (Continued)

(56) References Cited

U.S. PATENT DOCUMENTS 7,855,729 B2 * 12/2010 Onodera ................ H04N 5/247
  348/159
2012/0271948 A1 10/2012 Martin
  (Continued)

FOREIGN PATENT DOCUMENTS

CN  101877783 A  11/2010
CN  104349172 A  2/2015
  (Continued)

OTHER PUBLICATIONS

Machine Translation and Abstract of Chinese Publication No. CN101877783, Nov. 3, 2010, 15 pages.
  (Continued)

*Primary Examiner* — John R Schnurr
(74) *Attorney, Agent, or Firm* — Conley Rose, P.C.

(57) ABSTRACT

A load balancing method to resolve a problem of load imbalance, where the method includes obtaining first status information of the first device and first status information of the second device, obtaining second status information of the first device and second status information of the second device, calculating a space occupation ratio of the first device and a space occupation ratio of the second device respectively according to the second status information of the first device and the second status information of the second device, determining a balancing policy according to the space occupation ratio of the first device and the space occupation ratio of the second device, and perform scheduling according to the balancing policy to implement load balancing between the first device and the second device.

17 Claims, 8 Drawing Sheets

(52) U.S. Cl.
CPC ...... *H04L 67/1029* (2013.01); *H04L 67/1097* (2013.01); *H04N 5/23245* (2013.01)

(58) Field of Classification Search
CPC ............ H04N 21/4335; H04L 67/1008; H04L 67/1012; H04L 67/1029; H04L 67/1097
See application file for complete search history.

(56) References Cited

U.S. PATENT DOCUMENTS

| | | | |
|---|---|---|---|
| 2014/0085480 | A1 | 3/2014 | Saptharishi |
| 2017/0099463 | A1* | 4/2017 | Trani ................... H04N 7/181 |

FOREIGN PATENT DOCUMENTS

| | | |
|---|---|---|
| CN | 104363300 A | 2/2015 |
| EP | 2164003 A1 | 3/2010 |

OTHER PUBLICATIONS

Machine Translation and Abstract of Chinese Publication No. CN104349172, Feb. 11, 2015, 14 pages.

Machine Translation and Abstract of Chinese Publication No. CN104363300, Feb. 18, 2015, 15 pages.

Foreign Communication From a Counterpart Application, PCT Application No. PCT/CN2016/104054, English Translation of International Search Report dated Jan. 3, 2017, 2 pages.

Foreign Communication From a Counterpart Application, PCT Application No. PCT/CN2016/104054, English Translation of Written Opinion dated Jan. 3, 2017, 6 pages.

Foreign Communication From a Counterpart Application, European Application No. 16861524.3, Extended European Search Report dated Jun. 21, 2018, 8 pages.

* cited by examiner

LOAD BALANCING METHOD, AND RELATED APPARATUS AND SYSTEM

CROSS-REFERENCE TO RELATED APPLICATIONS

This application is a continuation of International Patent Application No. PCT/CN2016/104054 filed on Oct. 31, 2016, which claims priority to Chinese Patent Application No. 201510734298.3 filed on Nov. 2, 2015. The disclosures of the aforementioned applications are hereby incorporated by reference in their entireties.

TECHNICAL FIELD

The present disclosure relates to the communications field, and in particular, to a load balancing method, and a related apparatus and system.

BACKGROUND

In recent years, as a user quantity and a data amount explosively grow, a distributed architecture has increasingly become an infrastructure of many information technology (IT) enterprise platforms. Reliable low-cost large platforms, for example, a distributed computing platform and a distributed storage system, are constructed by stacking massive low-cost computing servers and storage servers. In these large platforms, a cluster is one of core technologies.

The cluster is a distributed collaboration technology, and a group for a collaborative operation is formed by massive nodes to complete a target task on a huge scale quickly and reliably. Based on a group operation, for the cluster, migration of a task on a faulty node and load balancing between nodes need to be considered in order to ensure that a cluster group reliably operates for a long time. A core of fault-based migration and balance balancing technologies is a scheduling algorithm, for example, a fault-based migration algorithm and a load balancing algorithm. The algorithm determines pressure balancing between nodes in the cluster group, avoiding a fault or long-time overload running of the entire cluster resulting from a fault or overload of an individual node.

In the security surveillance field, to meet a large-scale networking requirement of Safe City and a large campus, many network video recorders (NVR) are stacked for centralized management and maintenance. As a user imposes a higher requirement for reliability of video recording, a collaborative cluster is further constructed on a basis of stacking to form a reliable large-capacity video surveillance cloud platform.

Currently, in the video surveillance field, a video surveillance system is divided into a front end and a rear end. As shown in FIG. 1A, the front end is an Internet Protocol camera (IPC) configured to collect a real-time image and transmit a video stream to a rear NVR for forwarding and storage. The rear end is the NVR configured to access and control multiple IPCs in a centralized manner, obtain video streams of the IPCs, and forward and distribute the video streams to multiple users of a surveillance platform. In addition, the NVR has a large-capacity built-in storage or an external large disk array, and can store a recorded video in the surveillance platform for subsequent playback, download, and backup.

It can be learned that all IPCs are connected to the NVR and transmit bitstreams collected by the IPCs to the NVR for recording and storage. This requires that the NVR have a relatively strong access capability and sufficient storage space. Especially for the storage space, with the high-definition, 4000 pixels based (4K-based), and intelligent development, the NVR occupies more storage space. A single NVR cannot support bitstream storage of massive cameras. Therefore, a stacked networking mode is derived. As shown in FIG. 1B, in stacked networking, all NVRs are managed in a centralized manner, and a unified service entrance is provided, thereby solving difficulties such as centralized service access and device management in a large Safe City project. In addition, in the stacked networking, scale-out and dynamic scaling capabilities are further provided. When an IPC quantity increases, a new NVR may be added to access a new IPC. When the IPC quantity decreases, a user may reduce existing NVRs to decrease operating costs.

However, computing capabilities and storage space of NVRs are different. Therefore, in the stacked networking, load balancing cannot be implemented according to existing capabilities of all NVRs.

SUMMARY

Embodiments of the present disclosure provide a load balancing method, and a related apparatus and system to resolve a problem of load imbalance, implement load balancing between devices in a video surveillance system, and avoid a problem that a device has a short lifecycle due to overload or a waste of storage space resources is caused due to underload.

A first aspect of the present disclosure provides a load balancing method, where the load balancing method is applied to a video surveillance system, and the video surveillance system includes multiple devices, and the method includes obtaining, by the first device, first status information of the first device and first status information of the second device when a first device in the video surveillance system detects that load imbalance exists between the first device and a second device in the video surveillance system, obtaining, by the first device, second status information of the first device and second status information of the second device when neither a value corresponding the first status information of the first device or a value corresponding the first status information of the second device is greater than a preset threshold, calculating, by the first device, a space occupation ratio of the first device according to the second status information of the first device and a space occupation ratio of the second device according to the second status information of the second device, determining, by the first device, a balancing policy according to the space occupation ratio of the first device and the space occupation ratio of the second device, and performing, by the first device, scheduling according to the balancing policy to implement load balancing between the first device and the second device.

It can be learned that the first device determines a balancing policy using a space occupation ratio of the first device and a space occupation ratio of the second device, and performs scheduling according to the balancing policy to implement load balancing between the first device and the second device. It can be learned that, in the present disclosure, manual planning according to a load capability of a device does not need to be performed, and the first device automatically determines a balancing policy according to current space occupation ratios of the first device and the second device such that load balancing is implemented between devices. This reduces costs greatly, and avoids a short lifecycle of a device caused due to overload or a waste of storage space resources caused due to underload, thereby meeting a user requirement to the utmost extent.

In the present disclosure, a space occupation ratio is used to indicate a ratio of expectedly occupied storage space to total storage space. For example, expectedly occupied storage space of the first device is determined by connecting another device, and the space occupation ratio of the first device is represented as a ratio of storage space occupied by another device that is expected to be connected to the first device to total storage space of the first device. Certainly, in an embodiment, when no other device is expectedly connected to the first device, and the first device expects that a storage resource of the first device occupies storage space of the first device, the space occupation ratio of the first device is represented as a ratio of the storage space that is expected, by the first device, to be occupied by the storage resource of the first device to the total storage space of the first device.

In some optional implementations, calculating, by the first device, a space occupation ratio of the first device according to the second status information of the first device and a space occupation ratio of the second device according to second status information of the second device includes calculating, by the first device, the space occupation ratio of the first device according to channel quantity (Cn), bit rate (Br), and storage day (Sd) of an IPC connected to the first device, and calculating, by the first device, the space occupation ratio of the second device according to Cn, Br, and Sd of an IPC connected to the second device.

It can be learned that a Cn, Br, and Sd of a connected IPC are used as reference factors of the first status information in order to calculate a corresponding space occupation ratio. Load balancing is used to ensure that space occupation ratios of all devices tend to be the same. For example, a device having a strong load capability carries heavier load, and a device having a weak load capability carries lighter load such that each device carries corresponding load within a limited capability range. In conclusion, the space occupation ratios of all the devices tend to be the same, that is, no device is overloaded. After an IPC is connected to the first device and an IPC is connected to the second device, the IPC connected to the first device and the IPC connected to the second device transmit bitstreams to the first device and the second device, to form a recorded video for a user to play and download. Recording occupies storage space of the first device and the second device, and main factors affecting recording are the channel quantity, the Br, and the storage day. In the technical field of the present disclosure, recording is a core requirement, and core parameters of recording include a recording Br and recording duration. Other parameters such as a frame rate and a resolution are reflected in a change of the Br. The Br and the recording duration reflect occupation of the IPCs for the storage space of the first device and the second device. For a multi-channel device, occupation of each channel for storage space also needs to be considered. Storage space occupied by each IPC can be calculated based on the three core factors. The storage space of the first device and the second device is limited. Therefore, in the present disclosure, balancing of storage space occupation of the first device and the second device needs to be considered in order to meet requirements of different IPCs for storage space as much as possible.

In some optional implementations, determining, by the first device, a balancing policy according to the space occupation ratio of the first device and the space occupation ratio of the second device includes determining, by the first device, a first region and a second region according to regional positions of the first device and the second device, sequencing, by the first device, space occupation ratios of devices in the first region, determining, by the first device, a first target device and a second target device according to a result of sequencing the space occupation ratios of the devices in the first region, pre-scheduling, by the first device to the second target device, at least one target IPC connected to the first target device, and determining, by the first device, that pre-scheduling, to the second target device, at least one target IPC connected to the first target device is the balancing policy when an absolute difference between a space occupation ratio of the first target device and a space occupation ratio of the second target device decreases, or sequencing, by the first device, space occupation ratios of devices in the second region to determine a third target device when an absolute difference between a space occupation ratio of the first target device and a space occupation ratio of the second target device does not decrease, pre-scheduling, by the first device to the third target, at least one target IPC connected to the first target device such that an absolute difference between the space occupation ratio of the first target device and a space occupation ratio of the third target device decreases, and determining, by the first device, that pre-scheduling, to the third target device, at least one target IPC connected to the first target device is the balancing policy.

It can be learned that the space occupation ratios of the devices in the first region are first sequenced to determine the first target device and the second target device. For example, when the first target device is a device with a maximum space occupation ratio, and the second device is a device with a minimum space occupation ratio, at least one target IPC of the device with the maximum space occupation ratio is pre-scheduled to the device with the minimum space occupation ratio. The at least one target IPC is used to represent a device that is connected to the device with the maximum space occupation ratio and that pre-occupies relatively small or large storage space. For example, multiple IPCs are connected to the device with the maximum space occupation ratio. Storage space pre-occupied by the multiple IPCs is sequenced to determine an IPC with relatively small storage space as a target IPC. In an embodiment, during initial pre-scheduling, the device with the maximum space occupation ratio pre-schedules an IPC with relatively small storage space to the device with the minimum space occupation ratio, the device with the maximum space occupation ratio pre-schedules multiple IPCs with relatively small storage space to the device with the minimum space occupation ratio, or the device with the maximum space occupation ratio pre-schedules an IPC with relatively large storage space to the device with the minimum space occupation ratio. This may be determined according to an embodiment, and no limitation is imposed herein.

A second aspect of the present disclosure provides a load balancing apparatus, where the load balancing apparatus is applied to a video surveillance system, and the video surveillance system includes multiple devices, and the load balancing apparatus includes a detection module configured to detect whether load of a first device in the video surveillance system and load of a second device in the video surveillance system are balanced, an obtaining module configured to obtain first status information of the first device and first status information of the second device when the detection module detects that the load of the first device and the load of the second device are unbalanced, where the obtaining module is further configured to obtain second status information of the first device and second status information of the second device when neither a value corresponding to the first status information of the first device nor a value corresponding to the first status information of the second device is greater than a preset threshold, a calculation module configured to calculate a space occupation ratio of the first device according to the second status information of the first device and a space occupation ratio of the second device according to the second status information of the second device, where the second status information is obtained by the obtaining module, a determining module configured to determine a balancing policy according to the space occupation ratios, calculated by the calculation module, of the first device and the second device, and a scheduling module configured to perform scheduling according to the balancing policy determined by the determining module to implement load balancing between the first device and the second device.

It can be learned that the determining module determines a balancing policy using a space occupation ratio of the first device and a space occupation ratio of the second device, and the scheduling module performs scheduling according to the balancing policy to implement load balancing between the first device and the second device. It can be learned that, in the present disclosure, manual planning according to a load capability of a device does not need to be performed, and a balancing policy is automatically determined according to current space occupation ratios of the first device and the second device such that load balancing is implemented between devices. This reduces costs greatly, and avoids a short lifecycle of a device caused due to overload or a waste of storage space resources caused due to underload, thereby meeting a user requirement to the utmost extent.

A third aspect of the present disclosure provides a load balancing apparatus, where the load balancing apparatus is applied to a video surveillance system, the video surveillance system includes multiple devices, and the load balancing apparatus includes a memory, a processor, a transmitter, and a receiver, where the transmitter is connected to the receiver, the memory is connected to the processor, the processor is connected to the transmitter, and the processor is connected to the receiver, the processor is configured to obtain first status information of the first device and first status information of the second device by invoking an operation instruction stored in the memory when detecting that load imbalance exists between a first device in the video surveillance system and a second device in the video surveillance system, the processor is further configured to obtain second status information of the first device and second status information of the second device when neither a value corresponding to the first status information of the first device nor a value corresponding to the first status information of the second device is greater than a preset threshold, the processor is further configured to calculate a space occupation ratio of the first device according to the second status information of the first device and a space occupation ratio of the second device according to the second status information of the second device, determine a balancing policy according to the space occupation ratio of the first device and the space occupation ratio of the second device, and perform scheduling according to the balancing policy to implement load balancing between the first device and the second device.

The first status information includes at least one of a memory occupation rate, a central processing unit (CPU) occupation rate, or an input/output (I/O) occupation rate.

It can be learned that the processor determines a balancing policy using a space occupation ratio of the first device and a space occupation ratio of the second device, and performs scheduling according to the balancing policy to implement load balancing between the first device and the second device. It can be learned that, in the present disclosure, manual planning according to a load capability of a device does not need to be performed, and the processor automatically determines a balancing policy according to current space occupation ratios of the first device and the second device such that load balancing is implemented between devices. This reduces costs greatly, and avoids a short lifecycle of a device caused due to overload or a waste of storage space resources caused due to underload, thereby meeting a user requirement to the utmost extent.

A fourth aspect of the present disclosure provides a video surveillance system, where the video surveillance system includes a first device and a second device, and there are multiple second devices, the first device is configured to obtain first status information of the first device and first status information of the second device when detecting that load imbalance exists between the first device and the second device, the first device is further configured to obtain second status information of the first device and second status information of the second device when neither a value corresponding to the first status information of the first device nor a value corresponding to the first status information of the second device is greater than a preset threshold, the first device is further configured to calculate a space occupation ratio of the first device according to the second status information of the first device and a space occupation ratio of the second device according to the second status information of the second device, determine a balancing policy according to the space occupation ratio of the first device and the space occupation ratio of the second device, and perform scheduling according to the balancing policy to implement load balancing between the first device and the second device.

It can be learned that the first device in the video surveillance system determines a balancing policy using a space occupation ratio of the first device and a space occupation ratio of the second device in the video surveillance system, and performs scheduling according to the balancing policy to implement load balancing between the first device and the second device. It can be learned that, in the present disclosure, manual planning according to a load capability of a device does not need to be performed, and the first device in the video surveillance system automatically determines a balancing policy according to current space occupation ratios of the first device and the second device such that load balancing is implemented between devices. This reduces costs greatly, and avoids a short lifecycle of a device caused due to overload or a waste of storage space resources caused due to underload, thereby meeting a user requirement to the utmost extent.

DESCRIPTION OF EMBODIMENTS

The embodiments of the present disclosure provide a load balancing method, and a related apparatus and system, to resolve a problem of load imbalance, implement load balancing between devices in a video surveillance system, and avoid a problem that a device has a short lifecycle due to overload or a waste of storage space resources is caused due to underload.

Figure 1A:
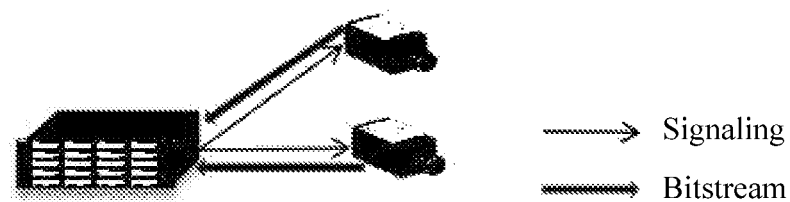
FIG. 1A is a schematic structural diagram of a connection between an NVR and an IPC.
Figure 1B:
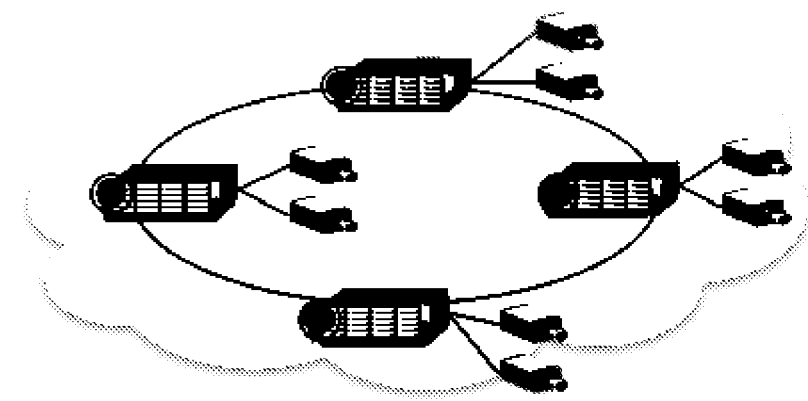
FIG. 1B is a schematic structural diagram of a video surveillance system according to an embodiment of the present disclosure.

First, a video surveillance system applied to the technical solutions of the present disclosure is described. As shown in FIG. 1B, the video surveillance system includes multiple devices, for example, a first device and a second device. Each of the first device and the second device is connected to an IPC. The first device is used as a management device, the second device is used as a managed device, and there are multiple second devices. In an embodiment, any device may be selected as a management device. Both the first device and the second device are NVRs. A large platform for a collaborative operation is constructed using multiple NVRs. The entire video surveillance system self-operates internally. A management NVR manages computing resources and storage resources of all NVRs in the video surveillance system in a centralized manner, to form a huge computing resource pool and storage resource pool in order to meet a requirement of a large Safe City project.

Figure 1C:
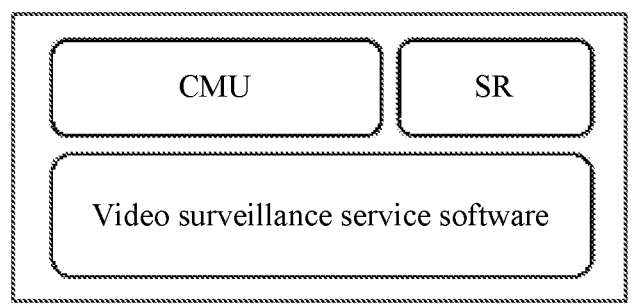
FIG. 1C is a schematic structural diagram of a device according to an embodiment of the present disclosure.

To construct a cluster, a cluster management unit (CMU) and a status reporter (SR) are introduced on each NVR. The CMU completes interconnection between all devices inside the cluster and cluster management. The SR completes collection and reporting of status information of all the devices inside the cluster. As shown in FIG. 1C, each NVR includes a CMU, an SR, and other service software, for example, video surveillance service software.

Figure 1D:
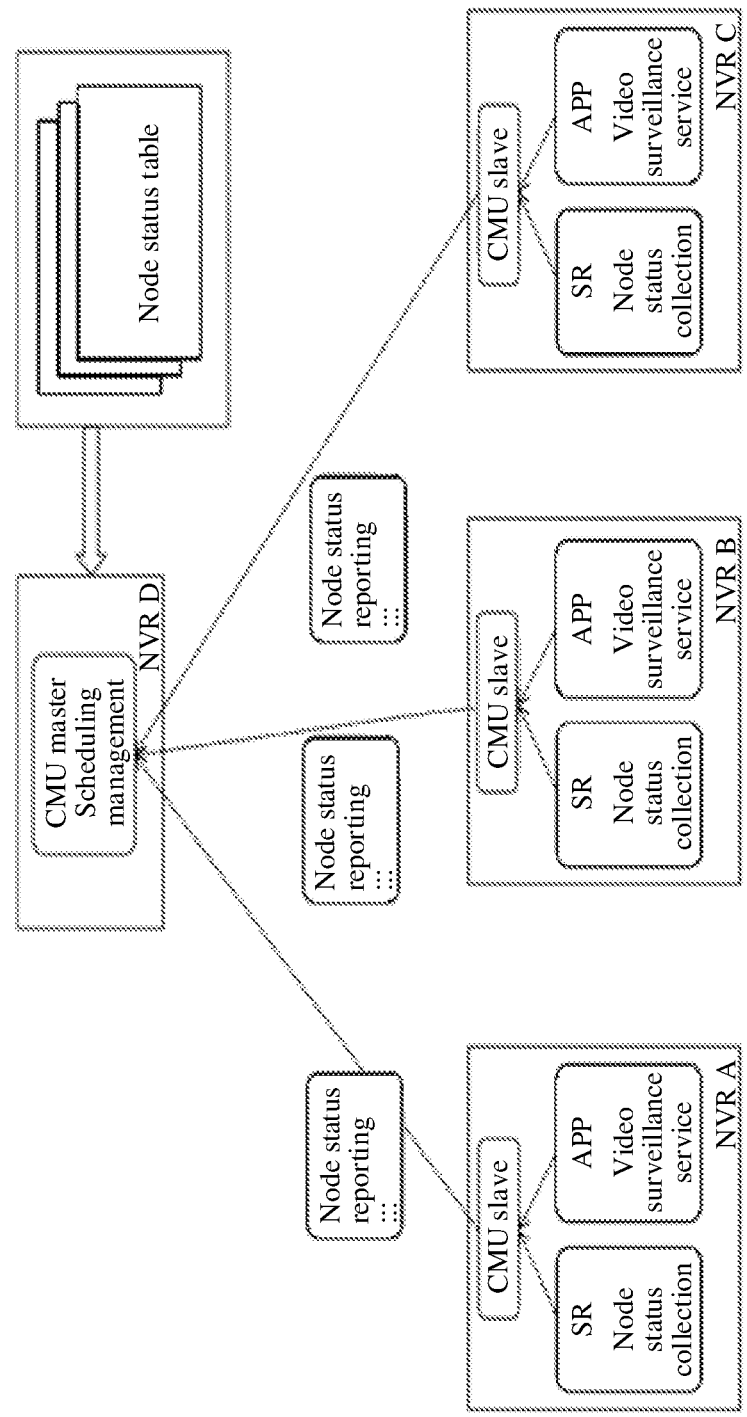
FIG. 1D is a schematic diagram of an embodiment of interconnection between devices according to an embodiment of the present disclosure.

In an embodiment, as shown in FIG. 1D, all the NVRs in the cluster are interconnected using respective CMUs to form a cluster communications network. A management device CMU Master undertakes a cluster management function, including status caching, scheduling computation, scheduling execution, and the like, and is a core support unit of the cluster. An SR of each NVR in the cluster periodically collects status data of the NVR, and reports the status data to the CMU Master using a CMU of the NVR, where the status data is used as basic data for scheduling computation. As shown in FIG. 1D, an NVR D is a management device Master of the cluster, an NVR A, an NVR B, and an NVR C are managed devices Slaves of the cluster. All the Slaves periodically report respective status information to the Master. The Master caches the status information of all the cluster members in a node status table in order to learn a whole status of the entire video surveillance system and use the status information as basic data of a scheduling algorithm.

Figure 2:
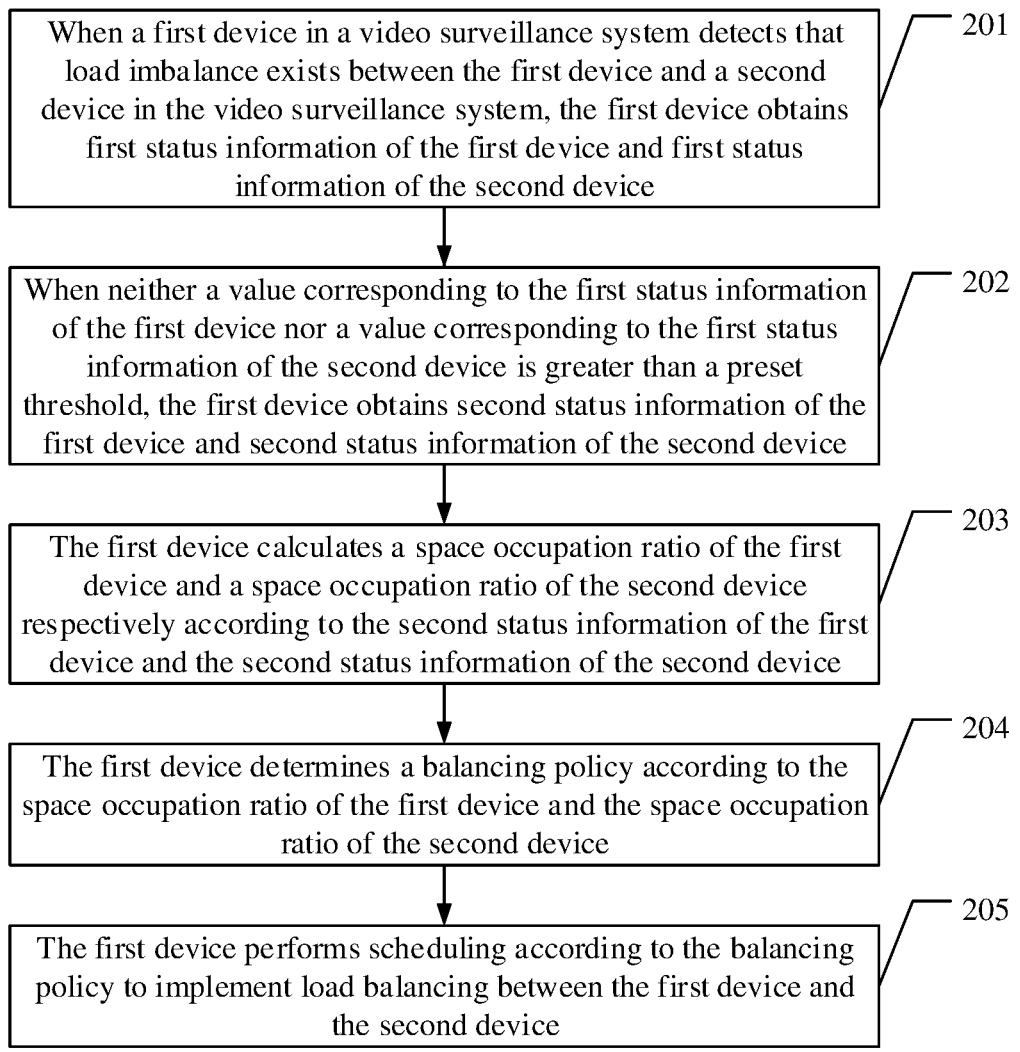
FIG. 2 is a schematic diagram of an embodiment of a load balancing method according to an embodiment of the present disclosure.

With reference to FIG. 1A to FIG. 1D, refer to FIG. 2. FIG. 2 is a flowchart of a load balancing method according to an embodiment of the present disclosure. The load balancing method is applied to the video surveillance system shown in FIG. 1B. The video surveillance system includes multiple devices. The embodiment includes the following steps.

Step 201. When a first device in the video surveillance system detects that load imbalance exists between the first device and a second device in the video surveillance system, the first device obtains first status information of the first device and first status information of the second device, where there are multiple second devices.

First, the first device is used as a manager to obtain load of the first device and load of the second device. When the load of the first device and the load of the second device are unbalanced, the first device obtains status information of the first device and status information of the second device. The first device presets a space occupation ratio difference threshold. If a difference between a space occupation ratio of the first device and a space occupation ratio of the second device is greater than the space occupation ratio difference threshold, the first device determines that the load of the first device and the load of the second device are unbalanced. Alternatively, the first device presets a space occupation ratio threshold. When both a space occupation ratio of the first device and a space occupation ratio of the second device are greater than the space occupation ratio threshold, the first device determines that the load of the first device and the load of the second device are unbalanced.

In an embodiment, the second device is used as a managed device, collects the status information of the second device using an SR of the second device, and reports the status information to a CMU of the first device using a CMU of the second device. Certainly, the first device also collects the status information of the first device using an SR of the first device, and reports the status information to the CMU of the first device.

In some optional embodiments, the first status information includes at least one of a memory occupation rate, a CPU occupation rate, or an I/O occupation rate. Certainly, the first status information may further include other information related to device storage space, for example, graphics processing unit (GPU) usage. No specific limitation is imposed herein.

Step 202. When neither a value corresponding to the first status information of the first device nor a value corresponding to the first status information of the second device is greater than a preset threshold, the first device obtains second status information of the first device and second status information of the second device.

In some optional embodiments, when any one of memory occupation rates, CPU occupation rates, and I/O occupation rates of the first device and the second device is greater than or equal to the preset threshold, a corresponding device is filtered out. Then, scheduling with a storage space occupation ratio as a core is performed. For example, a CPU occupation rate of a second device is greater than 80%, and cannot accept a new task in a load balancing process.

Alternatively, a memory occupation rate of a second device is greater than 80%, and cannot accept a new task in a load balancing process.

In this embodiment of the present disclosure, the preset threshold is a threshold preset in the entire video surveillance system, and may be set according to a status parameter of each device in the entire video surveillance system. When neither the value corresponding to the first status information of the first device nor the value corresponding to the first status information of the second device is greater than the preset threshold, the first device obtains the second status information of the first device and the second status information of the second device.

In some optional embodiments, the first device obtains the second status information of the first device, where the second status information of the first device includes at least one of a Cn, a Br, or an Sd of an IPC connected to the first device, and the first device obtains the second status information of the second device, where the second status information of the second device includes at least one of Cn, Br, or Sd of an IPC connected to the second device.

Certainly, in an embodiment, in addition to the foregoing several types of information, the second status information may further include bandwidth and the like. No specific limitation is imposed herein.

It should be noted that, as a main reference factor affecting storage space of the first device or the second device, in a preferred implementation, the second status information includes Cn, Br, and Sd of a connected IPC.

In an embodiment, the IPC is configured to collect a real-time image, and transmit a video stream to an NVR for forwarding and storage.

Step 203. The first device calculates a space occupation ratio of the first device according to the second status information of the first device and a space occupation ratio of the second device according to the second status information of the second device.

In some optional embodiments, when the second status information includes Cn, Br, and Sd of an IPC, the first device calculates the space occupation ratio of the first device according to Cn, Br, and Sd of the IPC connected to the first device, and the first device calculates the space occupation ratio of the second device according to Cn, Br, and Sd of the IPC connected to the second device.

In an embodiment, a specific calculation process includes both the space occupation ratio of the first device and the space occupation ratio of the second device are represented by Rt, where $$Rt = \sum_{i=1}^{n} D_i / Da \text{ and } D_i = \sum_{j=1}^{Cn} Br_j * Sd_j,$$

where Da is total storage space of the first device, $D_i$ is expected storage space of the IPC connected to the first device, and n indicates a total quantity of IPCs connected to the first device, or Da is total storage space of the second device, $D_i$ is expected storage space of the IPC connected to the second device, and n indicates a total quantity of IPCs connected to the second device, i=1, . . . , n, n is a positive integer, and j indicates a channel number.

For example, three IPCs are connected to the first device (certainly, in an embodiment, more IPCs may be connected to the first device, and this example is merely used for reference and description). Expected storage space of the three IPCs is $D_1$, $D_2$, and $D_3$ respectively. Da is the total storage space of the first device. The space occupation ratio of the first device is $Rt=(D_1+D_2+D_3)/Da$, where $$D_1 = \sum_{j1=1}^{Cn} Br_{j1} * Sd_{j1}, D_2 = \sum_{j2=1}^{Cn} Br_{j2} * Sd_{j2}, \text{ and}$$

$$D_3 = \sum_{j3=1}^{Cn} Br_{j3} * Sd_{j3}.$$

For example, when a total channel quantity Cn of an IPC connected to the first device is 2, $D_1=Br_1*Sd_1+Br_2*Sd_2$. In an embodiment, calculation of the space occupation ratio of the second device is similar to calculation of the space occupation ratio of the first device. For details, refer to calculation of the space occupation ratio of the first device. Details are not described herein again.

Certainly, in an embodiment, when the second status information changes, a corresponding calculation method is similar. For details, refer to calculation, performed when the second status information includes Cn, Br, and Sd of an IPC, of the space occupation ratio of the first device. Details are not described herein again.

Certainly, in an embodiment, when a single IPC connected to the first device or the second device has same Br and same Sd, a corresponding method for calculating expected storage space of the IPC is simple correspondingly. For example, when one IPC connected to the first device has same Br and same Sd, for the IPC, $D_1=Br*Sd*3$. It can be learned that, when an IPC connected to the first device or the second device has same Cn, same Br, and same Sd, the entire calculation method becomes simple.

Step 204. The first device determines a balancing policy according to the space occupation ratio of the first device and the space occupation ratio of the second device.

In this embodiment of the present disclosure, determining, by the first device, a balancing policy according to the space occupation ratio of the first device and the space occupation ratio of the second device includes determining, by the first device, a first region and a second region according to regional positions of the first device and the second device, sequencing, by the first device, space occupation ratios of devices in the first region, determining, by the first device, a first target device and a second target device according to a result of sequencing the space occupation ratios of the devices in the first region, pre-scheduling, by the first device to the second target device, at least one target IPC connected to the first target device, and determining, by the first device, that the pre-scheduling, to the second target device, at least one target IPC connected to the first target device is the balancing policy when an absolute difference between a space occupation ratio of the first target device and a space occupation ratio of the second target device decreases, or sequencing, by the first device, space occupation ratios of devices in the second region, to determine a third target device when an absolute difference between a space occupation ratio of the first target device and a space occupation ratio of the second target device does not decrease, pre-scheduling, by the first device to the third target, at least one target IPC connected to the first target device such that an absolute difference between the space occupation ratio of the first target device and a space occupation ratio of the third target device decreases, and determining, by the first device, that the pre-scheduling, to the third target device, at least one target IPC connected to the first target device is the balancing policy.

In an embodiment, it is assumed that there is one first device and N second devices, where N is an integer greater than 1. Regional positions of the first device and the N second devices are divided to determine the first region and the second region. Generally, regional positions of multiple devices among which there is a relatively short distance are determined as a region. To implement distance scheduling and reliable scheduling during subsequent scheduling, it is preferred to schedule an IPC to a closest first device or second device, or during scheduling, it is preferred to schedule an IPC to a first device or a second device with relatively good network quality such that service quality between the IPC and the first device or the second device is ensured.

Further, the space occupation ratios of the devices in the first region are sequenced. In an embodiment, the space occupation ratios of the devices in the second region may be first sequenced, or both the space occupation ratios of the devices in the first region and the space occupation ratios of the devices in the second region are sequenced. This may be determined according to an actual condition. No limitation is imposed herein.

For example, space occupation ratios of four devices in the first region are sequenced. According to a descending order of the space occupation ratios, corresponding devices are a device 2>a device 3>a device 1>a device 4. Therefore, it is determined that the first target device is the device 2 and the second target device is the device 4. In an embodiment, the first target device and the second target device are respectively a device with a maximum space occupation ratio and a device with a minimum space occupation ratio. Certainly, in an embodiment, if there are multiple devices with the maximum space occupation ratio, any one of the devices is selected as the first target device. Alternatively, if there are multiple devices with the minimum space occupation ratio, any one of the devices is selected as the second target device. No limitation is imposed herein.

Further, at least one target IPC of the device 2 is pre-scheduled to the device 4, and whether an absolute difference between the space occupation ratio of the device 2 and the space occupation ratio of the device 4 decreases is determined. In an embodiment, a target IPC is generally an IPC with relatively small storage space. For example, an IPC with smallest storage space and connected to the device 2 is pre-scheduled to the device 4, and whether an absolute difference between the space occupation ratio of the device 2 and the space occupation ratio of the device 4 decreases is determined. For example, if an initial space occupation ratio of the device 2 is m, and an initial space occupation ratio of the device 4 is n, an absolute difference between the initial space occupation ratios is |m−n|. When the device 2 pre-schedules the IPC with the smallest storage space and connected to the device 2 to the device 4, the space occupation ratio of the device 2 and the space occupation ratio of the device 4 change. For example, a space occupation ratio of the device 2 after the pre-scheduling is M, and a space occupation ratio of the device 4 after the pre-scheduling is N. Therefore, an absolute difference between the space occupation ratios after the pre-scheduling is |M−N|. Whether |M−N| is less than |m−n| is determined. If |M−N| is less than |m−n|, it is considered that the pre-scheduling succeeds, and the pre-scheduling the IPC with the smallest storage space and connected to the device 2 to the device 4 is used as the balancing policy. After pre-scheduling is performed, the space occupation ratio of the device 2 and the space occupation ratio of the device 4 change. Space occupation ratios of the four devices in the first region that are obtained after the pre-scheduling continue to be sequenced. Further, a subsequent balancing policy is determined according to the foregoing method to finally make space occupation ratios of all the devices tend to be the same.

It should be noted that, after pre-scheduling succeeds each time, a balancing policy is not executed immediately, but the balancing policy obtained after pre-scheduling succeeds each time is stored in a scheduling decision table. Balancing polices are implemented in batches only after all balancing policies are determined. This ensures that each balancing policy is determined according to status data in a memory, thereby enabling load of all devices to tend to be balanced.

Certainly, if |M−N| is not less than |m−n|, in an optional manner, the device 2 is deleted from a balance list, and then space occupation ratios of remaining devices continue to be sequenced according to the foregoing method, and subsequent pre-scheduling is performed. In another optional manner, it is assumed that the at least one target IPC of the device 2 is pre-scheduled to the device 4. When the absolute difference between the space occupation ratio of the device 2 and the space occupation ratio of the device 4 does not decrease, the space occupation ratios of the devices in the second region are sequenced. It is assumed that three second devices exist in the second region and are a device 5, a device 6, and a device 7, respectively. According to a descending order of space occupation ratios, corresponding devices are the device 6>the device 7>the device 5, respectively. Therefore, the device 5 with a minimum space occupation ratio is used as the third target device.

Further, the IPC with the smallest storage space and connected to the device 2 is pre-scheduled to the device 5, and whether an absolute difference between the space occupation ratio of the device 2 and the space occupation ratio of the device 5 decreases is determined. If the absolute difference between the space occupation ratio of the device 2 and the space occupation ratio of the device 5 decreases, the pre-scheduling the IPC with the smallest storage space and connected to the device 2 to the device 5 is determined as the balancing policy. If the absolute difference between the space occupation ratio of the device 2 and the space occupation ratio of the device 5 does not decrease, the device 2 is deleted from a balance list, and the foregoing method is executed on remaining devices to determine the balancing policy. Balancing policies are further executed in batches according to a scheduling decision table when there is only one device or no device in the entire balance list, that is, all the devices are pre-scheduled.

Step 205. The first device performs scheduling according to the balancing policy to implement load balancing between the first device and the second device.

It can be learned that a balancing policy is determined according to a space occupation ratio of each device, and scheduling is performed according to the balancing policy. This implements load balancing between a first device and a second device, implements load balancing between devices in a video surveillance system, and avoids a problem that a device has a short lifecycle due to overload or a waste of storage space resources is caused due to underload.

Figure 3A:
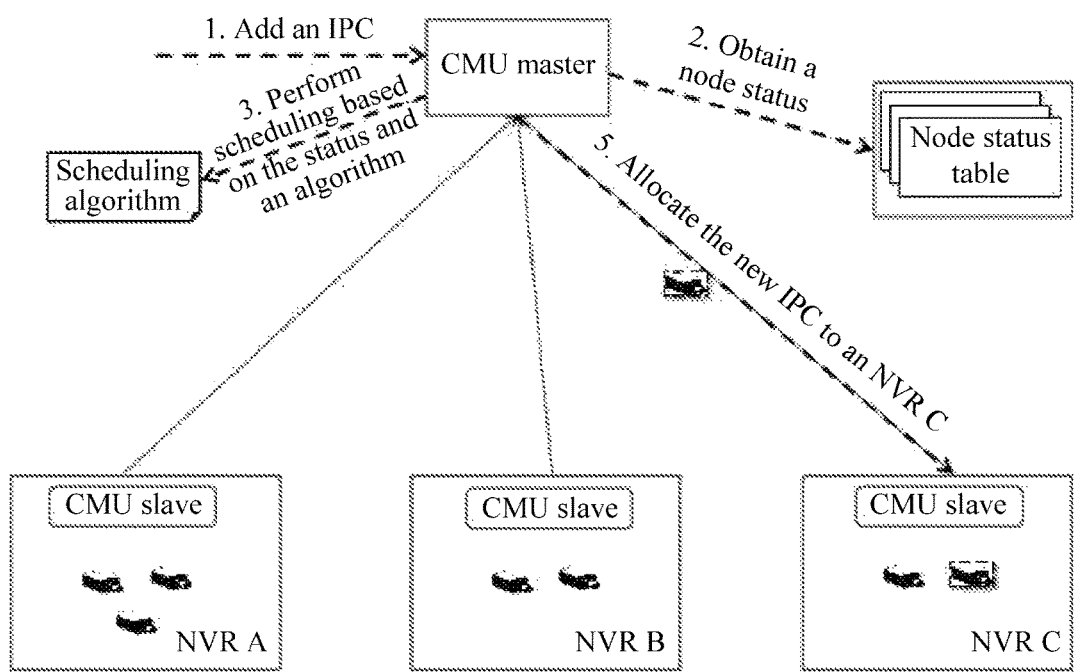
FIG. 3A is a schematic diagram of an embodiment of an application scenario of load balancing according to an embodiment of the present disclosure.

In an embodiment, as shown in FIG. 3A, when an IPC needs to be added, a CMU of a management device Master collects status information reported by a CMU of each slave member device, stores the status information in a node status table, obtains, by means of calculation using a load scheduling algorithm, a target NVR that is configured to be connected to the IPC, and then adds the IPC to the target NVR to finally implement balanced allocation of IPCs between the devices.

Figure 3B:
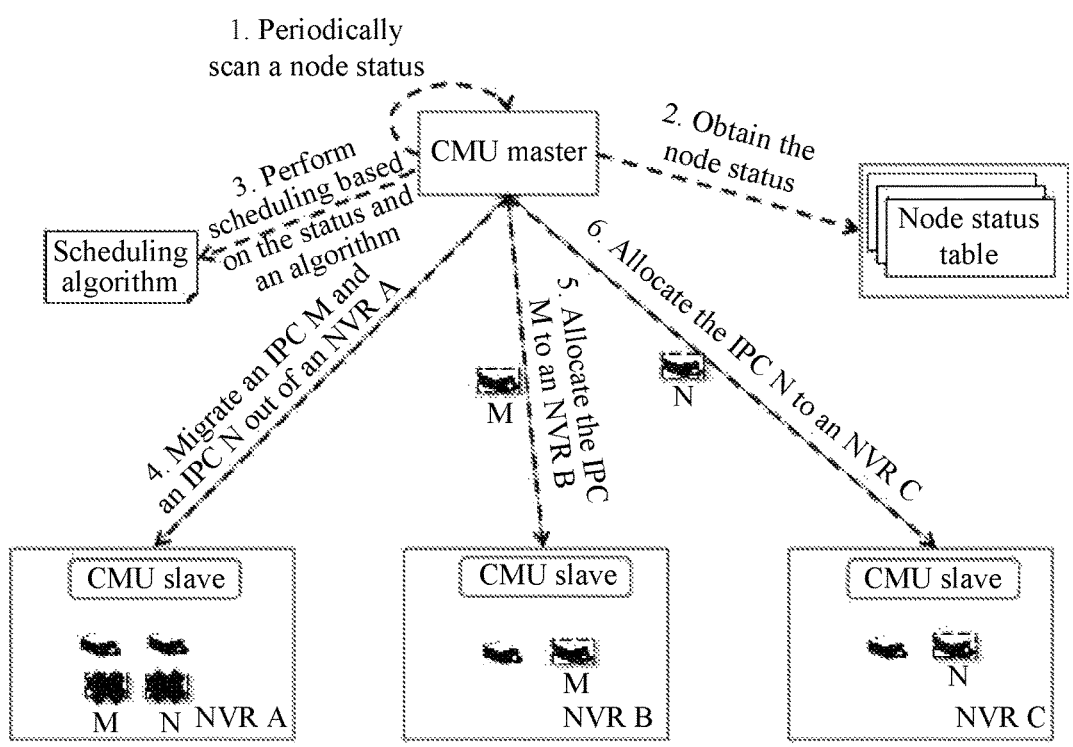
FIG. 3B is a schematic diagram of another embodiment of an application scenario of load balancing according to an embodiment of the present disclosure.

As shown in FIG. 3B, in a cluster running process, a CMU of a management device Master collects status information reported by a CMU of each slave member device, determines an overloaded device member and a device member with no load, and obtains a balancing policy of an IPC in a cluster by means of calculation using a load scheduling algorithm to finally implement balanced allocation between the device members.

Figure 3C:
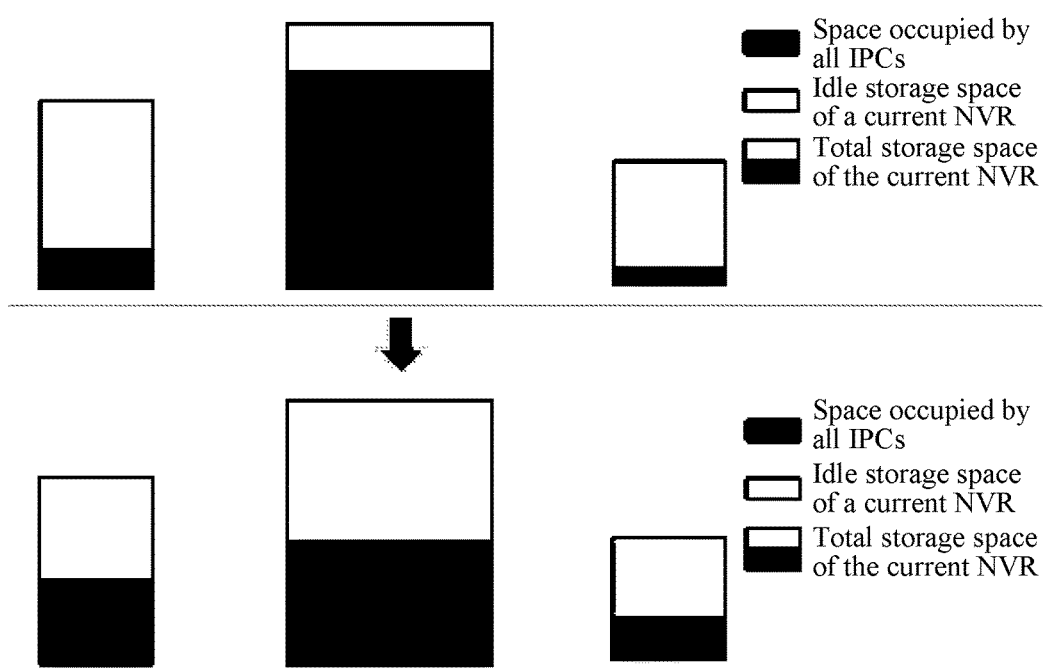
FIG. 3C is a schematic diagram of another embodiment of an application scenario of load balancing according to an embodiment of the present disclosure.

In an embodiment, as shown in FIG. 3C, after a balancing policy is implemented, space occupation ratios of all devices tend to be the same from initially different. This implements load balancing between all the devices, and avoids a problem that a device has a short lifecycle due to overload or a waste of storage space resources is caused due to underload.

Figure 4:
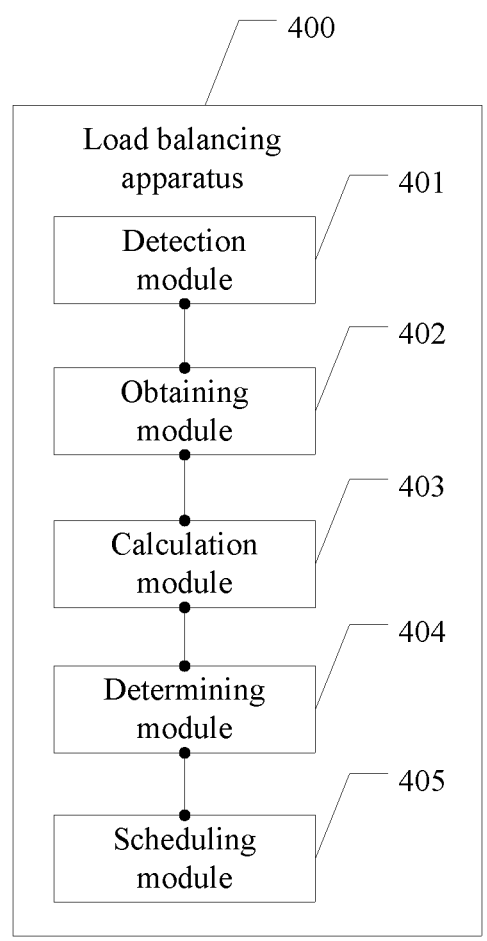
FIG. 4 is a schematic structural diagram of a load balancing apparatus according to an embodiment of the present disclosure.

With reference to the method embodiment shown in FIG. 2, further refer to FIG. 4. FIG. 4 is a schematic structural diagram of a load balancing apparatus 400 according to an embodiment of the present disclosure. The load balancing apparatus 400 is applied to a video surveillance system. The video surveillance system includes multiple devices. The load balancing apparatus 400 includes a detection module 401, an obtaining module 402, a calculation module 403, a determining module 404, and a scheduling module 405.

The detection module 401 is configured to detect whether load of a first device in the video surveillance system and load of a second device in the video surveillance system are balanced.

The obtaining module 402 is configured to obtain first status information of the first device and first status information of the second device. when the detection module 401 detects that the load of the first device and the load of the second device are unbalanced The obtaining module 402 is further configured to obtain second status information of the first device and second status information of the second device when neither a value corresponding to the first status information of the first device nor a value corresponding to the first status information of the second device is greater than a preset threshold.

The calculation module 403 is configured to calculate a space occupation ratio of the first device and a space occupation ratio of the second device respectively according to the second status information of the first device and the second status information of the second device, where the second status information is obtained by the obtaining module 402.

The determining module 404 is configured to determine a balancing policy according to the space occupation ratios, calculated by the calculation module 403, of the first device and the second device.

The scheduling module 405 is configured to perform scheduling according to the balancing policy determined by the determining module 404 to implement load balancing between the first device and the second device.

In some optional embodiments, the obtaining module 402 is further configured to obtain the second status information of the first device, where the second status information of the first device includes at least one of a Cn, a Br, or an Sd of an IPC connected to the first device.

The obtaining module 402 is further configured to obtain the second status information of the second device, where the second status information of the second device includes at least one of Cn, Br, or Sd of an IPC connected to the second device.

In some optional embodiments, the calculation module 403 is further configured to calculate the space occupation ratio of the first device according to Cn, Br, and Sd of the IPC connected to the first device, and the calculation module 403 is further configured to calculate the space occupation ratio of the second device according to Cn, Br, and Sd of the IPC connected to the second device.

In some optional embodiments, both the space occupation ratio of the first device and the space occupation ratio of the second device are represented by Rt, where $$Rt = \sum_{i=1}^{n} D_i / Da \text{ and } D_i = \sum_{j=1}^{Cn} Br_j * Sd_j,$$

where Da is total storage space of the first device, $D_i$ is expected storage space of the IPC connected to the first device, and n indicates a total quantity of IPCs connected to the first device, or Da is total storage space of the second device, $D_i$ is expected storage space of the IPC connected to the second device, and n indicates a total quantity of IPCs connected to the second device, i=1, . . . , n, n is a positive integer, and j indicates a channel number.

In some optional embodiments, the determining module 404 is further configured to determine a first region and a second region according to regional positions of the first device and the second device, sequence space occupation ratios of devices in the first region, determine a first target device and a second target device according to a result of sequencing the space occupation ratios of the devices in the first region, pre-schedule, to the second target device, at least one target IPC connected to the first target device, and determine that pre-scheduling, to the second target device, at least one target IPC connected to the first target device is the balancing policy when an absolute difference between a space occupation ratio of the first target device and a space occupation ratio of the second target device decreases, or sequence space occupation ratios of devices in the second region, to determine a third target device when an absolute difference between a space occupation ratio of the first target device and a space occupation ratio of the second target device does not decrease, pre-schedule, to the third target device, at least one target IPC connected to the first target device such that an absolute difference between the space occupation ratio of the first target device and a space occupation ratio of the third target device decreases, and determine that pre-scheduling, to the third target device, at least one target IPC connected to the first target device is the balancing policy.

In some optional embodiments, the first status information includes at least one of a memory occupation rate, a CPU occupation rate, or an I/O occupation rate.

Figure 5:
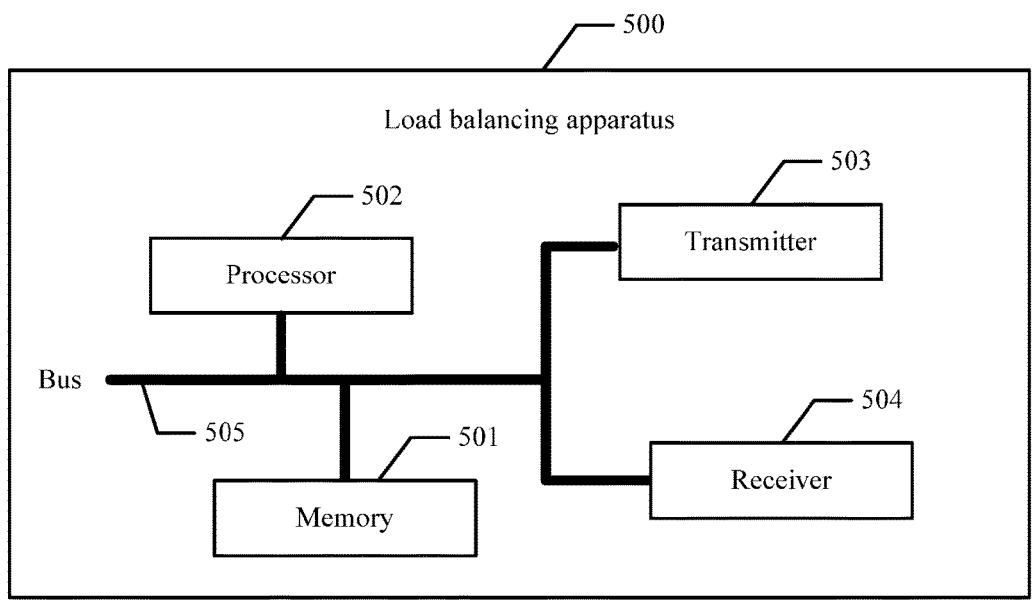
FIG. 5 is another schematic structural diagram of a load balancing apparatus according to an embodiment of the present disclosure.

In the embodiment shown in FIG. 4, a specific structure of the load balancing apparatus is described from a perspective of a function module. Referring to FIG. 5, a load balancing apparatus 500 is described from a hardware perspective. The load balancing apparatus 500 is applied to a video surveillance system. The video surveillance system includes multiple devices. The load balancing apparatus 500 includes a memory 501, a processor 502, a transmitter 503, and a receiver 504. The transmitter 503 and the receiver 504 are connected using a bus 505, the memory 501 and the processor 502 are connected using the bus 505, the processor 502 and the transmitter 503 are connected by the bus 505, and the processor 502 and the receiver 504 are connected using the bus 505.

The processor 502 is configured to obtain first status information of the first device and first status information of the second device by invoking an operation instruction stored in the memory 501 when detecting that load imbalance exists between a first device in the video surveillance system and a second device in the video surveillance system, where there are multiple second devices.

In some optional embodiments, the first status information includes at least one of a memory occupation rate, a CPU occupation rate, or an I/O occupation rate.

The processor 502 is further configured to obtain second status information of the first device and second status information of the second device when neither a value corresponding to the first status information of the first device nor a value corresponding to the first status information of the second device is greater than a preset threshold.

The processor 502 is further configured to calculate a space occupation ratio of the first device according to the second status information of the first device and a space occupation ratio of the second device according to the second status information of the second device.

The processor 502 is further configured to determine a balancing policy according to the space occupation ratio of the first device and the space occupation ratio of the second device.

The processor 502 is further configured to perform scheduling according to the balancing policy to implement load balancing between the first device and the second device.

A determining module determines a balancing policy using a space occupation ratio of a first device and a space occupation ratio of a second device, and a scheduling module performs scheduling according to the balancing policy to implement load balancing between the first device and the second device. It can be learned that, in the present disclosure, manual planning according to a load capability of a device does not need to be performed, and a balancing policy is automatically determined according to current space occupation ratios of the first device and the second device such that load balancing is implemented between devices. This reduces costs greatly, and avoids a short lifecycle of a device caused due to overload or a waste of storage space resources caused due to underload, thereby meeting a user requirement to the utmost extent.

In some optional embodiments, the processor 502 is further configured to obtain the second status information of the first device, where the second status information of the first device includes at least one of a Cn, a Br, or an Sd of an IPC connected to the first device, and obtain the second status information of the second device, where the second status information of the second device includes at least one of Cn, Br, or Sd of an IPC connected to the second device.

In some optional embodiments, the processor 502 is further configured to calculate the space occupation ratio of the first device according to Cn, Br, and Sd of the IPC connected to the first device, and calculate the space occupation ratio of the second device according to Cn, Br, and Sd of the IPC connected to the second device.

In some optional embodiments, both the space occupation ratio of the first device and the space occupation ratio of the second device are represented by Rt, where $$Rt = \sum_{i=1}^{n} D_i / Da \text{ and } D_i = \sum_{j=1}^{Cn} Br_j * Sd_j,$$

where Da is total storage space of the first device, $D_i$ is expected storage space of the IPC connected to the first device, and n indicates a total quantity of IPCs connected to the first device, or Da is total storage space of the second device, $D_i$ is expected storage space of the IPC connected to the second device, and n indicates a total quantity of IPCs connected to the second device, i=1, . . . , n, n is a positive integer, and j indicates a channel number.

In some optional embodiments, the processor 502 is further configured to determine a first region and a second region according to regional positions of the first device and the second device, sequence space occupation ratios of devices in the first region, determine a first target device and a second target device according to a result of sequencing the space occupation ratios of the devices in the first region, pre-schedule, to the second target device, at least one target IPC connected to the first target device, and determine that pre-scheduling, to the second target device, at least one target IPC connected to the first target device is the balancing policy when an absolute difference between a space occupation ratio of the first target device and a space occupation ratio of the second target device decreases, or sequence space occupation ratios of devices in the second region, to determine a third target device when an absolute difference between a space occupation ratio of the first target device and a space occupation ratio of the second target device does not decrease, pre-schedule, to the third target device, at least one target IPC connected to the first target device such that an absolute difference between the space occupation ratio of the first target device and a space occupation ratio of the third target device decreases, and determine that the pre-scheduling, to the third target device, at least one target IPC connected to the first target device is the balancing policy.

It can be learned that a processor determines a balancing policy using a space occupation ratio of a first device and a space occupation ratio of a second device, and performs scheduling according to the balancing policy to implement load balancing between the first device and the second device. It can be learned that, in the present disclosure, manual planning according to a load capability of a device does not need to be performed, and the processor automatically determines a balancing policy according to current space occupation ratios of the first device and the second device such that load balancing is implemented between devices. This reduces costs greatly, and avoids a short lifecycle of a device caused due to overload or a waste of storage space resources caused due to underload, thereby meeting a user requirement to the utmost extent.

Figure 6:
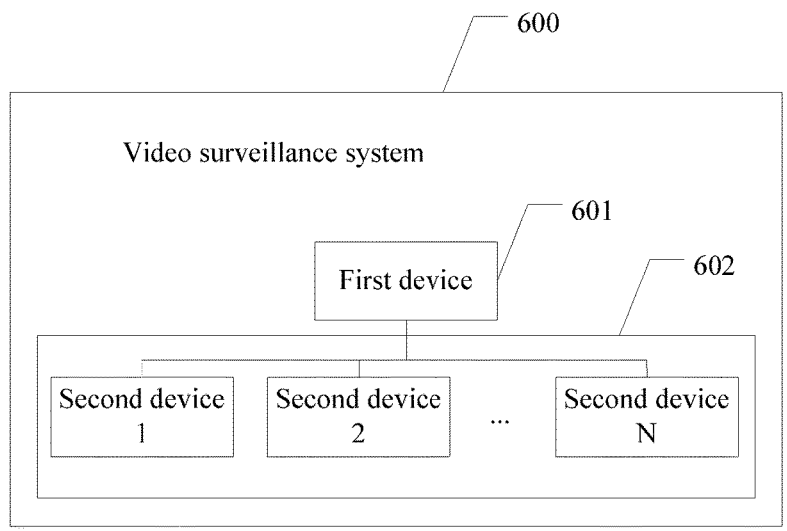
FIG. 6 is another schematic structural diagram of a video surveillance system according to an embodiment of the present disclosure.

Referring to FIG. 6, a video surveillance system 600 is provided. The video surveillance system includes a first device 601 and a second device 602.

The first device 601 is configured to obtain first status information of the first device 601 and first status information of the second device 602 when detecting that load imbalance exists the first device 601 and the second device 602, where there are multiple second devices 602 (for example, a second device 1, a second device 2, . . . , and a second device N, where N is an integer greater than 1).

The first device 601 is further configured to obtain second status information of the first device 601 and second status information of the second device 602 when neither a value corresponding to the first status information of the first device 601 nor a value corresponding to the first status information of the second device 602 is greater than a preset threshold.

The first device 601 is further configured to calculate a space occupation ratio of the first device 601 according to the second status information of the first device and a space occupation ratio of the second device 602 according to the second status information of the second device 602.

The first device 601 is further configured to determine a balancing policy according to the space occupation ratio of the first device 601 and the space occupation ratio of the second device 602.

The first device 601 is further configured to perform scheduling according to the balancing policy to implement load balancing between the first device 601 and the second device 602.

In some optional embodiments, the first device 601 is further configured to obtain the second status information of the first device 601, where the second status information of the first device 601 includes at least one of a Cn, a Br, or an Sd of an Internet Protocol camera IPC connected to the first device 601, and the first device 601 is further configured to obtain the second status information of the second device 602, where the second status information of the second device includes at least one of Cn, Br, or Sd of an IPC connected to the second device.

In other optional embodiments, the first device 601 is further configured to calculate the space occupation ratio of the first device according to Cn, Br, and Sd of the IPC connected to the first device 601, and the first device 601 is further configured to calculate the space occupation ratio of the second device according to Cn, Br, and Sd of the IPC connected to the second device 602.

In other optional embodiments, the first device 601 is further configured to determine a first region and a second region according to regional positions of the first device 601 and the second device 602, sequence space occupation ratios of devices in the first region, determine a first target device and a second target device according to a result of sequencing the space occupation ratios of the devices in the first region, pre-schedule, to the second target device, at least one target IPC connected to the first target device, and determine that the pre-scheduling, to the second target device, at least one target IPC connected to the first target device is the balancing policy when an absolute difference between a space occupation ratio of the first target device and a space occupation ratio of the second target device decreases, or sequence space occupation ratios of devices in the second region, to determine a third target device when an absolute difference between a space occupation ratio of the first target device and a space occupation ratio of the second target device does not decrease, pre-schedule, to the third target device, at least one target IPC connected to the first target device such that an absolute difference between the space occupation ratio of the first target device and a space occupation ratio of the third target device decreases, and determine that the pre-scheduling, to the third target device, at least one target IPC connected to the first target device is the balancing policy.

It can be learned that a first device 601 in a video surveillance system 600 determines a balancing policy using a space occupation ratio of the first device 601 and a space occupation ratio of a second device 602 in the video surveillance system, and performs scheduling according to the balancing policy to implement load balancing between the first device and the second device. It can be learned that, in the present disclosure, manual planning according to a load capability of a device does not need to be performed, and the first device 601 in the video surveillance system 600 automatically determines a balancing policy according to current space occupation ratios of the first device 601 and the second device 602 such that load balancing is implemented between devices. This reduces costs greatly, and avoids a short lifecycle of a device caused due to overload or a waste of storage space resources caused due to underload, thereby meeting a user requirement to the utmost extent.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to other approaches, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A load balancing method implemented by a first device in a video surveillance system, the load balancing method comprising:

detecting a load imbalance between the first device and a second device in the video surveillance system;

obtaining, in response to the detecting, first status information of the first device and first status information of the second device, wherein the first status information of the first device and the first status information of the second device comprise at least one of a central processing unit (CPU) occupation rate or an input/output (I/O) occupation rate;

obtaining, second status information of the first device and second status information of the second device when neither a value corresponding to the first status information of the first device nor a value corresponding to the first status information of the second device is greater than a preset threshold;

calculating a space occupation ratio of the first device according to the second status information of the first device and a space occupation ratio of the second device according to the second status information of the second device;

determining a balancing policy according to the space occupation ratio of the first device and the space occupation ratio of the second device; and performing scheduling according to the balancing policy to implement load balancing between the first device and the second device.

2. The load balancing method of claim 1, wherein the second status information of the first device comprises at least one of a first channel quantity (Cn), a first bit rate (Br), or a first storage day (Sd) of a first Internet Protocol camera (IPC) coupled to the first device, and wherein the second status information of the second device comprises at least one of a second Cn, a second Br, or a second Sd of a second IPC coupled to the second device.

3. The load balancing method of claim 2, further comprising:

further calculating the space occupation ratio of the first device according to the first Cn, the first Br, and the first Sd; and further calculating the space occupation ratio of the second device according to the second Cn, the second Br, and the second Sd.

4. The load balancing method of claim 3, wherein both the space occupation ratio of the first device and the space occupation ratio of the second device are represented by Rt as follows:

$$Rt = \sum_{i=1}^{n} D_i / Da, \quad D_i = \sum_{j=1}^{Cn} Br_j * Sd_j,$$

wherein Da is either a total storage space of the first device or a total storage space of the second device, $D_i$ is either an expected storage space of the first IPC or an expected storage space of the second IPC, n is either a total quantity of IPCs coupled to the first device or a total quantity of IPCs coupled to the second device, i=1, . . . , n, and j is a channel number.

5. The load balancing method of claim 4, further comprising:

determining a first region according to a regional position of the first device;

determining a second region according to a regional position of the second device;

performing a first sequencing of space occupation ratios of devices in the first region;

determining a first target device and a second target device based on the first sequencing;

performing a first pre-scheduling of a target IPC coupled to the first target device; and determining that the first pre-scheduling comprises the balancing policy when a first absolute difference between a space occupation ratio of the first target device and a space occupation ratio of the second target device decreases.

6. The load balancing method of claim 5, further comprising:

performing a second sequencing of space occupation ratios of devices in the second region to determine a third target device when the first absolute difference does not decrease;

performing a second pre-scheduling of the target IPC such that a second absolute difference between the space occupation ratio of the first target device and a space occupation ratio of the third target device decreases; and determining that the second pre-scheduling comprises the balancing policy.

7. A load balancing apparatus in a video surveillance system, the load balancing apparatus comprising:

a memory; and a processor coupled to the memory and configured to:

detect a load imbalance between a first device and a second device in the video surveillance system;

obtain, in response to the detecting, first status information of the first device and first status information of the second device, wherein the first status information of the first device and the first status information of the second device comprise at least one of a central processing unit (CPU) occupation rate or an input/output (I/O) occupation rate;

obtain second status information of the first device and second status information of the second device when neither a value corresponding to the first status information of the first device nor a value corresponding to the first status information of the second device is greater than a preset threshold;

calculate a space occupation ratio of the first device according to the second status information of the first device and a space occupation ratio of the second device according to the second status information of the second device;

determine a balancing policy according to the space occupation ratio of the first device and the space occupation ratio of the second device; and perform scheduling according to the balancing policy to implement load balancing between the first device and the second device.

8. The load balancing apparatus of claim 7, wherein the second status information of the first device comprises at least one of a first channel quantity (Cn), a first bit rate (Br), or a first storage day (Sd) of a first Internet Protocol camera (IPC) coupled to the first device, and wherein the second status information of the second device comprises at least one of a second Cn, a second Br, or a second Sd of a second IPC coupled to the second device.

9. The load balancing apparatus of claim 8, wherein the processor is further configured to:
further calculate the space occupation ratio of the first device according to the first Cn, the first Br, and the first Sd; and
further calculate the space occupation ratio of the second device according to the second Cn, the second Br, and the second Sd.

10. The load balancing apparatus of claim 9, wherein both the space occupation ratio of the first device and the space occupation ratio of the second device are represented by Rt as follows:

$$Rt = \sum_{i=1}^{n} D_i / Da, \; D_i = \sum_{j=1}^{Cn} Br_j * Sd_j,$$

wherein Da is either a total storage space of the first device or a total storage space of the second device, $D_i$ is either an expected storage space of the first IPC or an expected storage space of the second IPC, n is either a total quantity of IPCs coupled to the first device or a total quantity of IPCs coupled to the second device, i=1, . . . , n, and j is a channel number.

11. The load balancing apparatus of claim 10, wherein the processor is further configured to:
determine a first region according to a regional position of the first device;
determine a second region according to a regional position of the second device;
perform a first sequencing of space occupation ratios of devices in the first region;
determine a first target device and a second target device based on the first sequencing;
perform a first pre-scheduling of a target IPC coupled to the first target device; and
determine that the first pre-scheduling comprises the balancing policy when a first absolute difference between a space occupation ratio of the first target device and a space occupation ratio of the second target device decreases.

12. The load balancing apparatus of claim 11, wherein the processor is further configured to:
perform a second sequencing of space occupation ratios of devices in the second region to determine a third target device when the first absolute difference does not decrease;
perform a second pre-scheduling of the target IPC such that a second absolute difference between the space occupation ratio of the first target device and a space occupation ratio of the third target device decreases; and
determine that the second pre-scheduling comprises the balancing policy.

13. A video surveillance system comprising:
a second device; and
a first device configured to:
detect a load imbalance between the first device and the second device;
obtain, in response to the detecting, first status information of the first device and first status information of the second device, wherein the first status information of the first device and the first status information of the second device comprise at least one of a central processing unit (CPU) occupation rate or an input/output (I/O) occupation rate;
obtain second status information of the first device and second status information of the second device when neither a value corresponding to the first status information of the first device nor a value corresponding to the first status information of the second device is greater than a preset threshold;
calculate a space occupation ratio of the first device according to the second status information of the first device and a space occupation ratio of the second device respectively according to the second status information of the second device;
determine a balancing policy according to the space occupation ratio of the first device and the space occupation ratio of the second device; and
perform scheduling according to the balancing policy to implement load balancing between the first device and the second device.

14. The video surveillance system of claim 13, wherein the second status information of the first device comprises at least one of a first channel quantity (Cn), a first bit rate (Br), or a first storage day (Sd) of a first Internet Protocol camera (IPC) coupled to the first device, and wherein the second status information of the second device comprises at least one of a second Cn, a second Br, or a second Sd of a second IPC coupled to the second device.

15. The video surveillance system of claim 14, wherein the first device is further configured to:
further calculate the space occupation ratio of the first device according to the first Cn, the first Br, and the first Sd; and
further calculate the space occupation ratio of the second device according to the second Cn, the second Br, and the second Sd.

16. The video surveillance system of claim 15, wherein the first device is further configured to:
determine a first region according to a regional position of the first device;
determine a second region according to a regional position of the second device;
perform a first sequencing of space occupation ratios of devices in the first region,
determine a first target device and a second target device based on the first sequencing;
perform a first-scheduling of a target IPC coupled to the first target device; and
determine that the first pre-scheduling comprises the balancing policy when a first absolute difference between a space occupation ratio of the first target device and a space occupation ratio of the second target device decreases.

17. The video surveillance system of claim 16, wherein the first device is further configured to:
perform a second sequencing of space occupation ratios of devices in the second region to determine a third target device when the first absolute difference does not decrease;
perform a second pre-scheduling of the target IPC such that a second absolute difference between the space occupation ratio of the first target device and a space occupation ratio of the third target device decreases; and
determine that the second pre-scheduling comprises the balancing policy.

* * * * *

UNITED STATES PATENT AND TRADEMARK OFFICE
CERTIFICATE OF CORRECTION

PATENT NO. : 10,469,805 B2  
APPLICATION NO. : 15/969446  
DATED : November 5, 2019  
INVENTOR(S) : Tianke Wang et al.

Page 1 of 1

It is certified that error appears in the above-identified patent and that said Letters Patent is hereby corrected as shown below:

On the Title Page

Foreign Application Priority Data: "2005 1 0734298" should read "2015 1 0734298.3"

Signed and Sealed this
Twenty-fourth Day of December, 2019

Andrei Iancu
*Director of the United States Patent and Trademark Office*